US 6,321,279 B1

(12) United States Patent
Bonola

(10) Patent No.: US 6,321,279 B1
(45) Date of Patent: Nov. 20, 2001

(54) SYSTEM FOR IMPLEMENTING INTELLIGENT I/O PROCESSING IN A MULTI-PROCESSOR SYSTEM BY REDIRECTING I/O MESSAGES TO A TARGET CENTRAL PROCESSOR SELECTED FROM THE MULTI-PROCESSOR SYSTEM

(75) Inventor: Thomas J. Bonola, Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/152,997

(22) Filed: Sep. 14, 1998

(51) Int. Cl.$^7$ ...................................................... G06F 13/14
(52) U.S. Cl. .............................. 710/36; 710/40; 710/64; 709/102; 709/105
(58) Field of Search ................................ 710/36, 40, 64; 709/102, 105

(56) References Cited

U.S. PATENT DOCUMENTS

| | | | | |
|---|---|---|---|---|
| 4,827,403 | * | 5/1989 | Steele, Jr. et al. ....................... | 712/13 |
| 4,831,518 | * | 5/1989 | Yu et al. . | |
| 5,119,377 | * | 6/1992 | Cobb et al. ............................. | 714/38 |
| 5,414,856 | * | 5/1995 | Yokota ................................... | 710/240 |
| 5,535,406 | * | 7/1996 | Kolchinsky ............................. | 712/10 |
| 5,572,680 | * | 11/1996 | Ikeda et al. ........................... | 709/243 |
| 5,640,584 | * | 6/1997 | Kandasamy et al. ................... | 712/30 |
| 5,680,403 | * | 10/1997 | Riello et al. ........................... | 370/532 |
| 5,727,219 | * | 3/1998 | Lyon et al. ............................. | 710/268 |
| 5,790,397 | * | 8/1998 | Bissett et al. ......................... | 364/131 |
| 5,790,895 | * | 8/1998 | Krontz et al. .......................... | 710/64 |
| 5,924,093 | * | 7/1999 | Potter et al. ............................ | 707/7 |
| 5,968,139 | * | 10/1999 | Klein ...................................... | 710/10 |
| 6,038,685 | * | 3/2000 | Bissett et al. .......................... | 714/12 |
| 6,047,122 | * | 4/2000 | Spiller ................................... | 395/678 |
| 6,078,945 | * | 6/2000 | Hinsley ................................. | 709/105 |
| 6,094,689 | * | 7/2000 | Embry et al. ............................ | 710/5 |
| 6,108,719 | * | 8/2000 | Klein ..................................... | 710/10 |

* cited by examiner

Primary Examiner—Thomas Lee
Assistant Examiner—Abdelmoniem Elamin
(74) Attorney, Agent, or Firm—Conley, Rose & Tayon, P.C.

(57) ABSTRACT

A software program is used in conjunction with a standard general purpose multi-processor computer system as a means of implementing an I$_2$O-compliant input-output processor ("IOP") without requiring a special hardware IOP processor embedded on a PCI device card and connected to a computer system PCI bus. At least one of the multi-processor is targeted for operating a special software operating system module. The special software operating system module is capable of emulating the I$_2$O-compliant input-output operating system program. This enables the targeted CPU to act as a virtual IOP. A driver software module is inserted into the operating system during computer system initialization which causes the software operating system to operate as if it is communicating with a physical IOP installed on a PCI bus, but instead the driver software module is redirecting the message to one of the virtual IOPs, thus making operation of the computer system indistinguishable from messages that would have been processed by a hardware implemented IOP in a computer system. Legacy computers may also implement I$_2$O functionality without needing to be PCI bus configured, nor requiring special hardware IOP.

22 Claims, 14 Drawing Sheets

SYSTEM FOR IMPLEMENTING INTELLIGENT I/O PROCESSING IN A MULTI-PROCESSOR SYSTEM BY REDIRECTING I/O MESSAGES TO A TARGET CENTRAL PROCESSOR SELECTED FROM THE MULTI-PROCESSOR SYSTEM

CROSS REFERENCE TO RELATED PATENT APPLICATION

This patent application is related to commonly owned U.S. patent application Ser. No. 09/153,211; filed Sep. 14, 1998 still pending; entitled "Method and System for Implementing Intelligent Distributed Input-Output Processing as a Software Process in a Host Operating System Environment" by Thomas J. Bonola, and is hereby incorporated by reference for all purposes.

BACKGROUND OF THE INVENTION

1. Field of the Invention

The present invention relates to a computer system using intelligent input-output ($I_2O$), and more particularly, to a multi-processor computer system using at least one of its processors for processing $I_2O$ transactions.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WANs").

A significant part of the ever-increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full-motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed information (data and address) buses.

The computers system has a plurality of information buses such as a host bus, a memory bus, at least one high speed local peripheral expansion bus, and other peripheral buses such as the Small Computer System Interface ("SCSI"), Extension to Industry Standard Architecture ("EISA"), Industry Standard Architecture ("ISA"), and Peripheral Component Interconnect ("PCI"). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

A widely used peripheral expansion bus that may be used in IBM-compatible PCs, Apple computers and RISC workstations is a high speed expansion bus standard called the "Peripheral Component Interconnect" or "PCI." The PCI bus standard is microprocessor-independent and has been embraced by a significant number of peripheral hardware manufacturers and software programmers. A more complete definition of the PCI local bus may be found in the PCI Local Bus Specification, revision 2.1; PCI/PCI Bridge Specification, revision 1.0; PCI System Design Guide, revision 1.0; and PCI BIOS Specification, revision 2.1, the disclosures of which are hereby incorporated by reference. These PCI specifications are available from the PCI Special Interest Group, P.O. Box 14070, Portland, Oreg. 97214.

Computer system peripheral hardware devices, i.e., hard disks, CD-ROM readers, network interface cards, video graphics controllers, modems and the like, may be supplied by various hardware vendors. These hardware vendors must supply software drivers for their respective peripheral devices used in each computer system even though the peripheral device may plug into a standard PCI bus connector. The number of software drivers required for a peripheral device multiplies for each different computer and operating system. In addition, both the computer vendor, operating system vendor and software driver vendor must test and certify the many different combinations of peripheral devices and the respective software drivers used with the various computer and operating systems. Whenever a peripheral device or driver is changed or an operating system upgrade is made, retesting and recertification may be necessary.

The demand for peripheral device driver portability between operating systems and host computer systems, combined with increasing requirements for intelligent, distributed input-output ("I/O") processing has led to the development of an "Intelligent Input/Output" ("$I_2O$") specification. The basic objective of the $I_2O$ specification is to provide an I/O device driver architecture that is independent of both the specific peripheral device being controlled and the host operating system. This is achieved by logically separating the portion of the driver that is responsible for managing the peripheral device from the specific implementation details for the operating system that it serves. By doing so, the part of the driver that manages the peripheral device becomes portable across different computer and operating systems. The $I_2O$ specification also generalizes the nature of communication between the host computer system and peripheral hardware, thus providing processor and bus technology independence.

The $I_2O$ specification, entitled "Intelligent I/O ($I_2O$) Architecture Specification," Draft Revision 1.5, dated March 1997, is available from the $I_2O$ Special Interest Group, 404 Balboa Street, San Francisco, Calif. 94118; the disclosure of this I$_2$O specification is hereby incorporated by reference.

FIG. 1 illustrates a schematic block diagram of a multi-processor computer system. The computer system is generally indicated by the numeral 100 and comprises central processing units ("CPUs") 102, core logic 104, system random access memory ("RAM") 106, a video graphics controller 110, a local frame buffer 108, a video display 112, a PCI/SCSI bus adapter 114, a PCI/EISA/ISA bridge 116, a PCI/IDE controller 118, and PCI/PCI bus bridges 124a, 124b. The local frame buffer 108 connects to a video graphics controller 110 which interfaces and drives a video display 112. Single or multilevel cache memory (not illustrated) may also be included in the computer system 100 according to the current art of microprocessor computer systems.

The CPUs 102 are connected to the core logic 104 through a CPU host bus 103. The system RAM 106 is connected to the core logic 104 through a memory bus 105. The core logic 104 includes a host-to-PCI bridge between the host bus 103, the memory bus 105 and a first PCI bus 109. The local frame buffer memory 108, and PCI/PCI bridges 124a, 124b are connected to the first PCI bus 109. The PCI/SCSI bus adapter 114 and PCI/EISA/ISA bridge 116 are connected to the PCI/PCI bridge 124a through a second PCI bus 117. The PCI/IDE controller 118 and a network interface card ("NIC") 122 are connected to the PCI/PCI bridge 124b through a third PCI bus 115. Some of the PCI devices such as the local frame buffer 108/Video controller 110 and NIC 122 may plug into PCI connectors on the computer system 100 motherboard (not illustrated). PCI connectors 160 and 162 are illustrated connected to the PCI bus 117 and are for plugging PCI device cards into the computer system 100. Three PCI buses 109, 117 and 115 are illustrated in FIG. 1, and may have logical PCI bus numbers of zero, one and two, respectively.

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113.

When the computer system 100 is first turned on, start-up information stored in the ROM BIOS 140 is used to begin operation thereof. Basic setup instructions are stored in the ROM BIOS 140 so that the computer system 100 can load more complex operating system software from a memory storage device such as the disk 130. Before the operating system software can be loaded, however, certain hardware in the computer system 100 must be configured to properly transfer information from the disk 130 to the CPU 102. In the computer system 100 illustrated in FIG. 1, the PCI/SCSI bus adapter 114 must be configured to respond to commands from the CPUs 102 over the PCI buses 109 and 117, and transfer information from the disk 130 to the CPU 102 via buses 117, 109 and 103. The PCI/SCSI bus adapter 114 is a PCI device and remains platform independent. Therefore, separate hardware independent commands are used to setup and control any PCI device in the computer system 100. These hardware independent commands, however, are located in a PCI BIOS contained in the computer system ROM BIOS 140. The PCI BIOS is firmware that is hardware specific but meets the general PCI specification. Plug and play, and PCI devices in the computer system are detected and configured when a system configuration program is executed. The results of the plug and play, and PCI device configurations are stored in the NVRAM 142 for later use by the startup programs in the ROM BIOS 140 and PCI BIOS which configure the necessary computer system 100 devices during startup. After startup of the computer system 100, the operating system software including the I$_2$O software, according to the I$_2$O Specification incorporated by reference above, is loaded into the RAM 106 for further operation of the computer system 100. An I/O processor, a hardware device, called an I/O Processor ("IOP") 202, is utilized in conjunction with the I$_2$O Specification, as more fully described hereinbelow.

FIG. 2 illustrates a functional block diagram of the I$_2$O specification, which divides the peripheral drivers into two parts: 1) the Operating System Services Module ("OSM") 212 which interfaces with the host operating system ("OS") 200; and 2) the Device Driver Module ("DDM") 204 that executes on an IOP 202 and which interfaces with a particular hardware device, media or server (206) that the driver must manage. All of the modules are capable of communicating with each other across a common communication layer 208. As defined in the I$_2$O Specification, the IOP 202 is a platform (node) consisting of a processor, memory, and I/O devices that are managed independently from other processors within the system for the sole purpose of processing I/O transactions.

FIG. 3 illustrates the basic software architecture of an I$_2$O compliant system. A DDM can be a hardware driver module ("HDM") 308, an Intermediate Service Module ("ISM") 306, or both. These two modules interface with other components via a communication system comprised of two parts: 1) message layers 300 and 304 which operate in conjunction with the host operating system 200 and the IOP 202, respectively, to set up a communications session between parties (OSM-DDM or DDM-DDM); and 2) a transport layer 302 which defines how the two parties will share information. Much like a standard communications protocol, the message layers 300, 304 reside on the transport layer 302.

The communications model defined in the I$_2$O specification, when combined with an execution environment and configuration interface, provides the DDM 204 with a host-independent interface. The modules are able to communicate without knowledge of the underlying bus architecture or computer system topology. Messages form a meta-language for the modules to communicate in a manner that is independent of the bus topology and host OS interfaces. The communications model for the I$_2$O architecture is a message passing system. The I$_2$O communication model is analogous to a connection oriented networking protocol, such as TCP/IP, in which the two parties interested in exchanging messages utilize the communication layer 208 to set up a connection and exchange data and control.

FIG. 4 illustrates the basic I$_2$O communication model. When the OSM 212 is presented with a request from the host OS 200, it translates the request into an I$_2$O request (400) and invokes the host's Message Transport layer 402 to deliver the message. The OSM Message Transport layer 402 removes the first free message frame (MFA) 404 from the remote IOP's (202) inbound free list 408, places the request information into the MFA 404 and posts the inbound message 406 in the remote IOP's (202) inbound post queue 408.

The remote IOP's (202) Message Transport layer 414 removes the message 412 from the inbound post queue 408, extracts the request information from the inbound MFA 412, returns the now-free MFA 412 to the Inbound free list 408, and dispatches the posted request 416 to the appropriate DDM 204 for processing,.

Upon completion of the request, the DDM 204 issues a response 420 that notifies the IOP 202 to dispatch the result back to the OSM 212 by sending a message through the $I_2O$ Message Layer. The remote IOP's Message Transport Layer 414 removes a free MFA 422 from the outbound free list 426, places the response data 420 into the MFA 424, posts the MFA 424 into the outbound post list 426, and notifies the OSM 212 that a response is waiting. The host Message Transport Layer 402 reads the MFA 430 from the outbound post list 426, removes the response data 432 from the MFA, returns (writes) the now-free MFA 428 to the outbound free list 426, and returns the response 432 to the OSM 212. The OSM 212 behaves just like any other device driver in the host OS 200. The OSM 212 interfaces to host-specific Application Programming Interfaces ("APIs"), translating them to a neutral message-based format that is then sent to a DDM 204 for processing.

Referring now to FIG. 5, operations flow of a standard $I_2O$-compliant system is illustrated. The OS 200 of the host CPU(s) 102 issues an I/O request 500. The OSM 212 accepts the request 500 and translates it (step 502) into a message 504 addressed to the target DDM 204 running on the IOP 202. The OSM 212 invokes the host Message Transport layer 402 to deliver the message. The host Message Transport layer 402 queues the message 510 by copying it (step 508) across the PCI buses 109 and 117 into a message frame buffer on the remote IOP 202. The remote IOP 202 Message Transport 414 posts the message 514 to the event queue (step 512) of the DDM 204. The DDM 204 then processes the request (step 516).

After processing the message and satisfying the request (step 516), the DDM 204 builds a reply 520 (step 518), addresses the reply 520 to the initiator of the request, and invokes the remote IOP 202 Message Transport layer 414 to send the reply 524 to the initiator. The remote IOP Message Transport layer 414 queues the reply 524 by copying it (step 522), across the PCI buses 109, 117, into a message frame buffer residing at the host's Message Transport layer 402. The remote IOP 202 then alerts the host's Message Transport layer 402 that a message is ready for delivery. The host's Message Transport layer 402 invokes the OSM's 212 message handler (step 526) which retrieves the OS 200 I/O request 532 from the message in order to complete the OS I/O request (step 530). Finally, the request itself is returned to the OS 200 (step 528).

Referring now to FIG. 6, a schematic block diagram of a standard $I_2O$ architecture is illustrated. The DDMs 204a and 204b are the lowest level modules in the $I_2O$ environment, encapsulating the software which is specific to a particular controller and the associated peripheral devices (LAN 206a and disk 206b), in essence, providing an abstract device driver for the $I_2O$ environment. The DDM translation layer is unique to each individual peripheral device and vendor, and supports a range of operating types, including synchronous, asynchronous request, event-driven, and polled. The DDMs 204a and 204b, which execute on the IOP 202, are managed by the $I_2O$ real-time input-output operating system ("iRTOS") 608, which provides the necessary support for the operating system processes and bus-independent execution. DDMs in general may therefore be designed in a manner which minimizes changes when moving from one computer system hardware platform to another.

In order to support the $I_2O$ device model, the $I_2O$ specification defines a hardware architecture which uses a single host processor (which may consist of multiple processors 102a, 102b and 102c on a single host bus) and an intelligent I/O subsystem containing one or more physical hardware I/O processors 202. The I/O subsystem 202 has its own operating system 608, local memory (ROM and RAM) and local I/O bus(es) (not illustrated). The dedicated I/O processor(s) 202 may be located on a plug-in feature card, generally a PCI device card. Special memory must also be provided for each dedicated I/O processor so that both private and shared memory are available. The private memory is only used by the associated I/O processor 202, but the shared memory must be available to all of the computer system resources.

The shared memory, through appropriate memory address translators, is the vehicle through which different I/O processors and the host processor communicate with one another through the message and transport layers. Messages sent to the IOP 202 are allocated from the inbound free list 406 and placed in the inbound post queue 408 located at an address equal to the PCI card's base address plus 0x40 (hexadecimal) (600). Messages from the IOP 202 to the OSM 212 are allocated from the outbound free list 604 and placed in an outbound post queue 606 located at an address equal to the PCI card's base address plus 0x44 (602).

According to the $I_2O$ Specification, these I/O processors (IOP 202) require a separate computer subsystem complete with its own dedicated microprocessor, memory, internal information bus(es) and printed circuit board real estate. This is neither cost effective nor practical for manufacturing general use computer systems having an optimal performance to cost ratio. In addition, legacy computer systems having only ISA and EISA buses could not utilize newer OS and peripheral devices running under the $I_2O$ specification because of their lack of a PCI bus(es).

What is needed is a method and system for implementing intelligent distributed I/O processing, such as $I_2O$, in a multi-processor computer system without requiring special hardware for a dedicated I/O processor subsystem.

SUMMARY OF THE INVENTION

The present invention provides a software program used in conjunction with a standard general purpose multi-processor computer system as a means of implementing an $I_2O$-compliant IOP without requiring a special hardware IOP processor embedded on a PCI device card. The present invention utilizes software modules inserted into the operating system during computer system initialization, thereby causing the OSM of the OS to operate as if it is communicating with a physical IOP installed on a PCI bus, but instead is utilizing at least one of the multi-processors as a virtual input-output processor (hereinafter "V-IOP") of the computer system. These software modules intercept messages to and from the DDMs and assign them to the V-IOP, thus making operation of the computer system with the present invention indistinguishable from messages that would have been processed by a hardware configured IOP in the computer system.

Therefore, the present invention solves the technical problem of implementing $I_2O$ functionality in a computer system without requiring the added cost and complexity of a special hardware $I_2O$ compliant IOP device. The present invention also solves the technical problem of implementing $I_2O$ functionality on systems that could not otherwise utilize the $I_2O$ standard, such as non-PCI bus configured legacy computers.

Thus, the present invention provides a method and system for implementing intelligent distributed input-output processing in a multi-processor computer system by allocating one or more of the multi-processors of the host computer system as an $I_2O$-compliant IOP running the DDMs and operating under the $I_2O$ communications protocols. The DDMs may use system memory which utilizes cache coherency hardware provided by the host multi-processor computer system. The present invention may store $I_2O$ message frames in the host main memory without traversing over the I/O bus(es) unless needed by a target device. In addition, the present invention enables $I_2O$ functionality on currently installed computers without requiring hardware upgrades to a dedicated hardware I/O processor subsystem, thus enabling non-PCI bus configured computers to take advantage of new OS and peripheral hardware utilizing the $I_2O$ specification.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
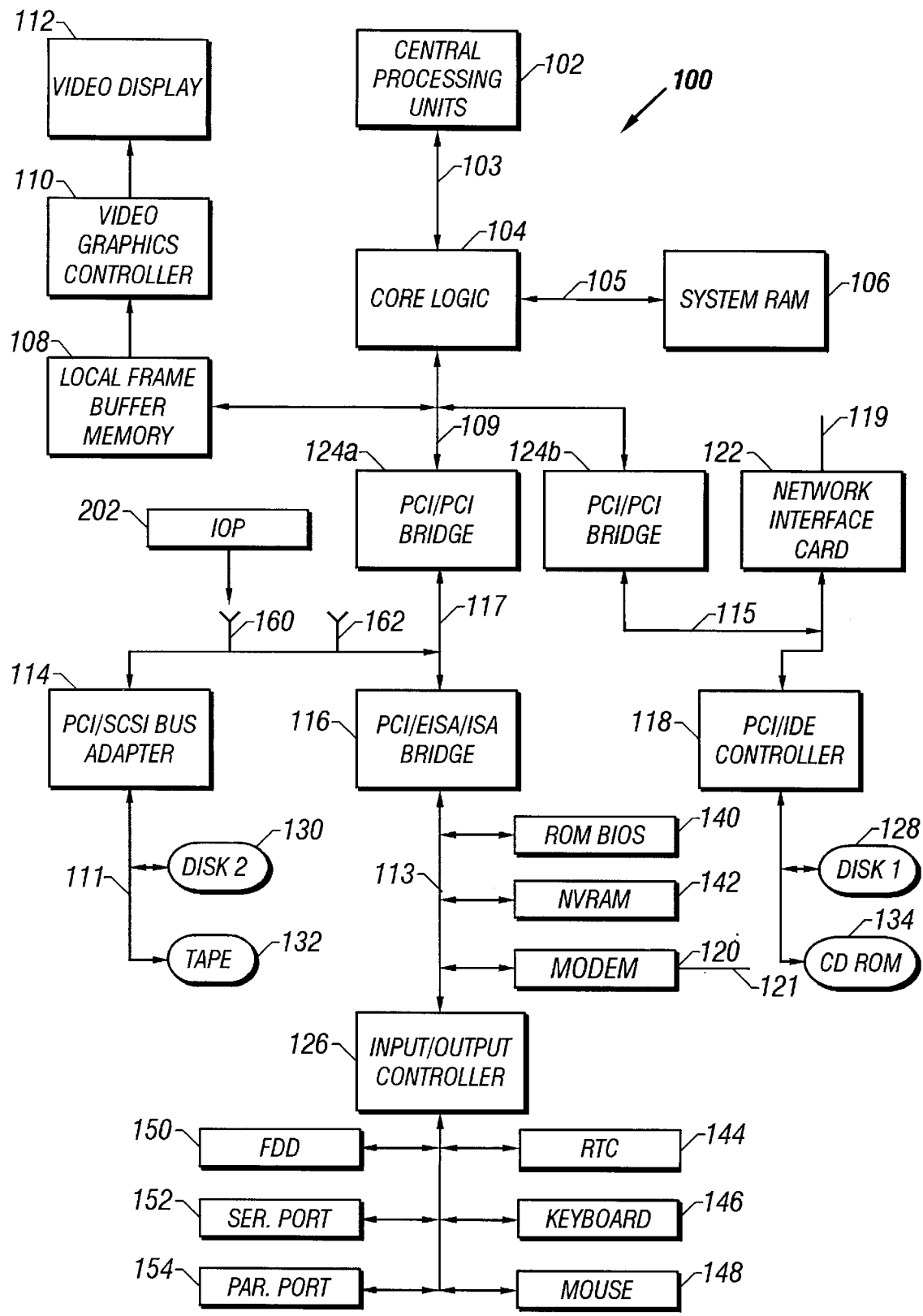
FIG. 1 is a schematic block diagram of a typical computer system.
Figure 2:
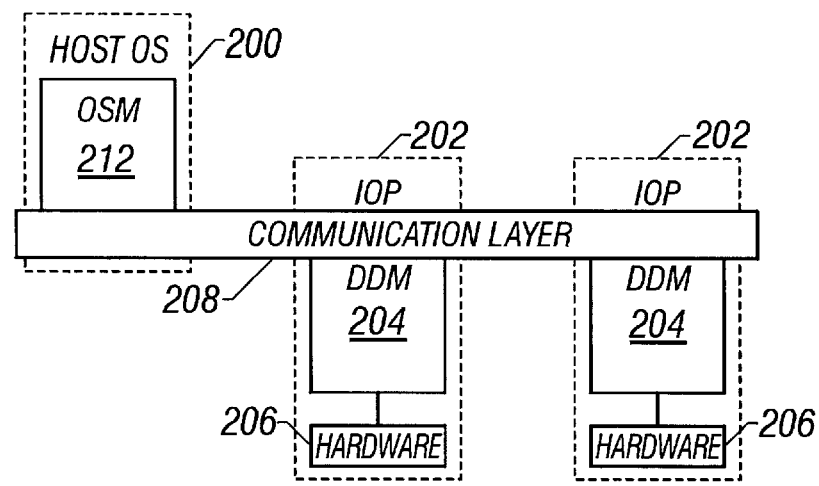
FIG. 2 is a schematic block diagram of the typical $I_2O$ split driver model.
Figure 3:
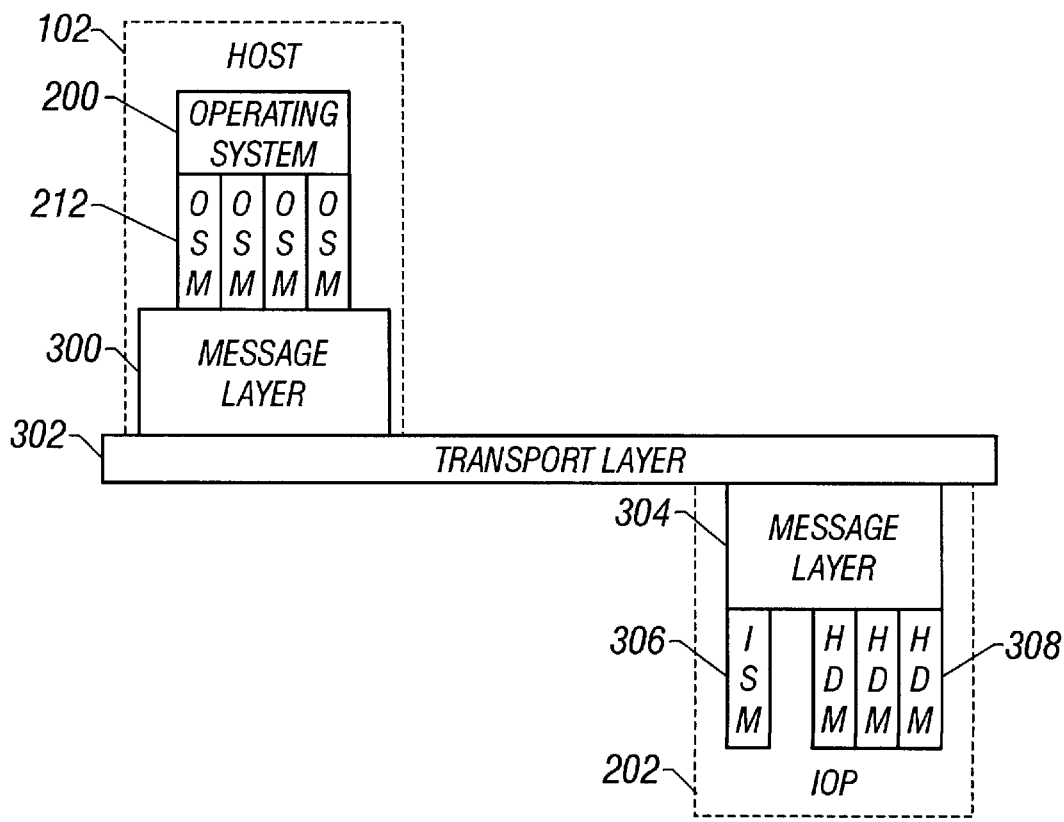
FIG. 3 is a schematic block diagram of the $I_2O$ software architecture.
Figure 4:
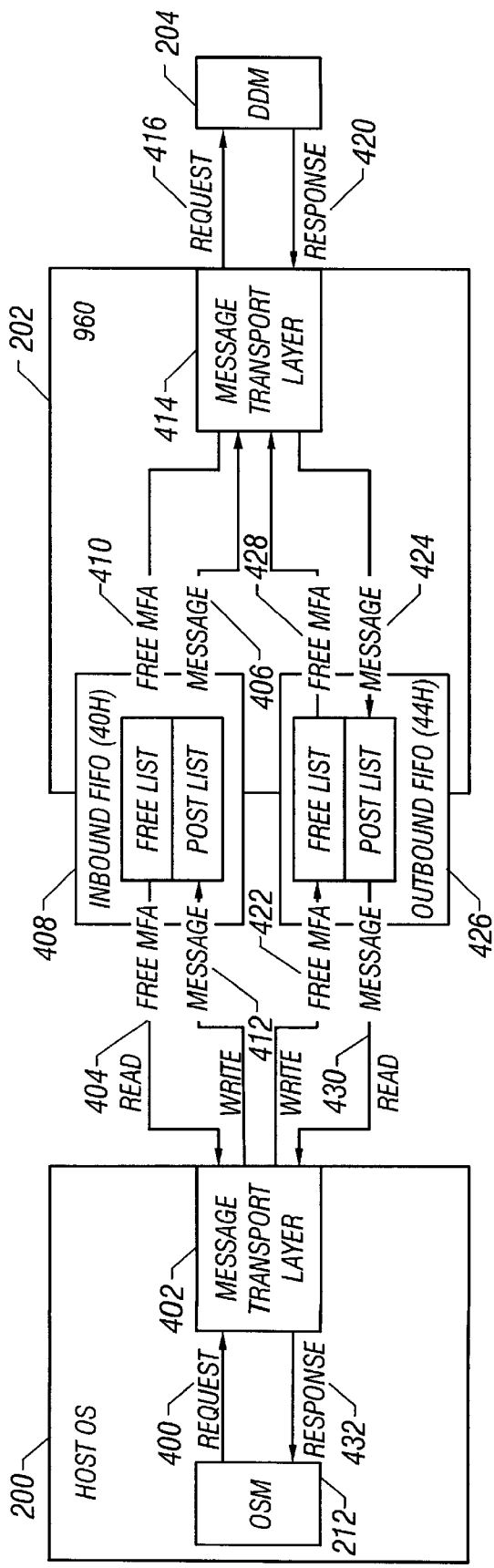
FIG. 4 is a schematic block diagram of the $I_2O$ communication model.
Figure 5:
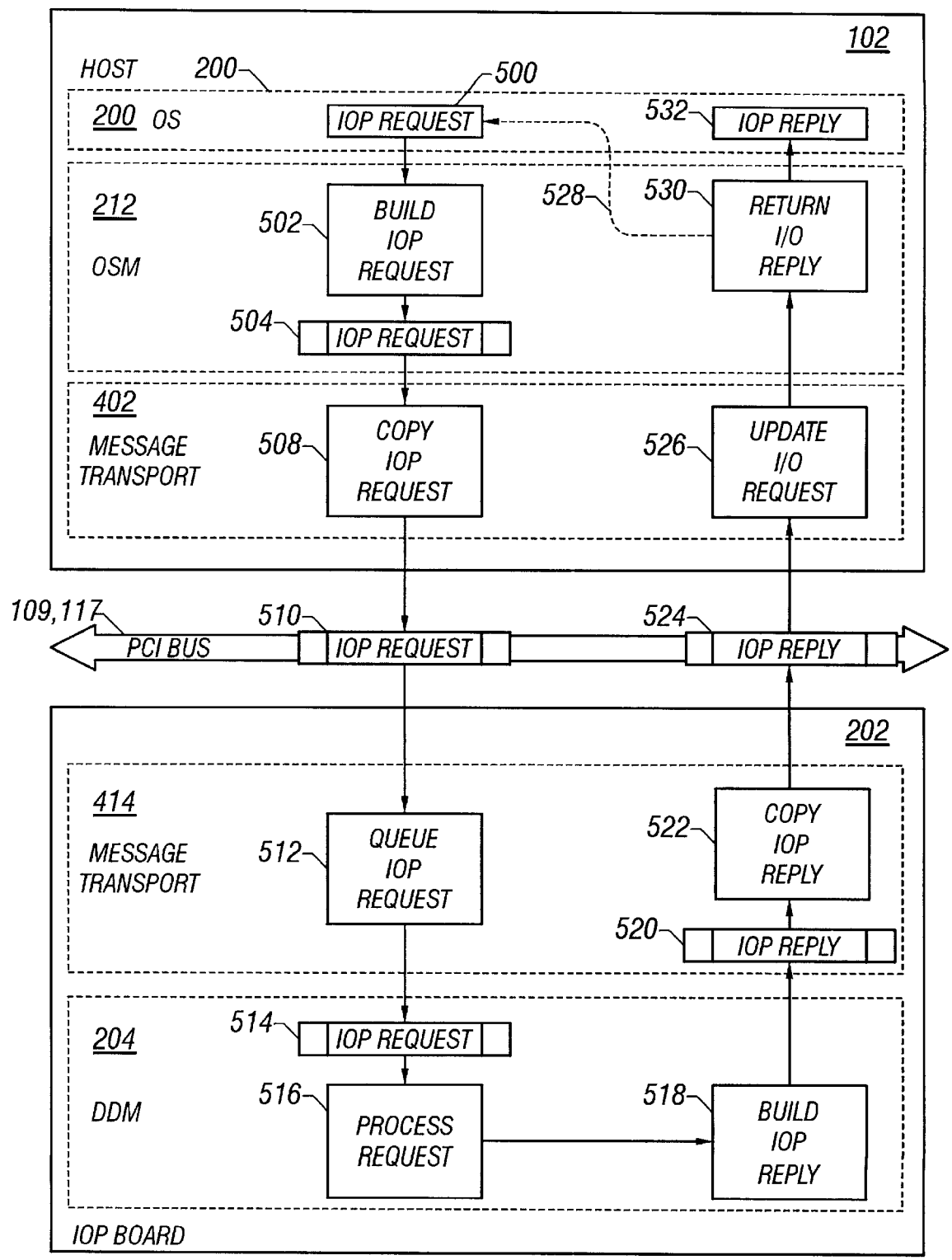
FIG. 5 is a schematic block diagram of the standard $I_2O$ I/O operations flow.

The present invention is a system and method for implementing an $I_2O$-controlled IOP system using general computer system hardware controlled by software. Although the following describes the implementation of the present invention on an $I_2O$-compliant system, it will be understood by those of ordinary skill in the art that the present invention can work with other input-output schemes besides the $I_2O$ scheme. The present invention comprises: (1) a system driver (V-IOP driver) program capable of intercepting and redirecting input-output related messages and capable of handling interrupts; (2) a real-time operating system program (V-IOP OS) that provides communication between $I_2O$-controlled devices and the operating system module (OSM) that contains the V-IOP driver; and (3) an installation is program that installs the V-IOP driver and the V-IOP OS image onto the computer system and designates the number of CPUs that are to be devoted to input-output processing.

A CPU that runs under the V-IOP OS is called a V-IOP ("virtual input-output processor"). More than one CPU can be operated under the V-IOP OS so that multiple I/O commands can be processed in parallel. The V-IOP OS is not intended to be run under the bootstrap processor (i.e., the CPU that is running the host OS). Consequently, the number of V-IOPs possible on any computer system is the number of CPUs less one.

When an interrupt signal emanates from, or is sent to, the host operating system (specifically, the OSM), the V-IOP driver is invoked. The V-IOP driver interprets the intercepted signals and, if the signal is associated with an $I_2O$-controlled device, forwards the signal to one of the V-IOPs. The V-IOP OS, which contains a special wrapper for the $I_2O$-compliant real-time input-output operating system executable, then processes the forwarded signal. This arrangement allows multiple input-output signals to be processed in parallel and does not require a dedicated processor on a separate board.

Installation of the Software onto the Computer System

The software of the present invention is installed conventionally onto the computer system. In the preferred embodiment of the present invention, there are two electronic files: a V-IOP driver that is loaded by the host operating system, and a V-IOP executable image that runs on one or more of the multiprocessors. An installation program is provided to facilitate the setup of the two electronic files on the computer system. The installation program prompts the computer system operator to identify the folder(s) where the two files (the V-IOP driver and the V-IOP OS) are to be stored and requests the operator to designate the number of CPUs that are to be devoted to input-output processing. The installation program then copies the two files to the appropriate directory and, for example, modifies the system registry or otherwise stores information to reflect the number of CPUs that are to be devoted to the software of the present invention.

It should be understood that the number of CPUs originally designated during the installation phase may not be the number actually designated upon system startup. Problems could arise. For example, one of the multiprocessors originally allocated to the present invention may have been removed. For this reason, upon booting of the computer system, the V-IOP driver of the present invention counts the number of CPUs present on the computer system and allocates either the number originally requested, or as many CPU's as are available less one (that is the bootstrap processor (BSP)).

Configuration of the Apparatus

Figure 6:
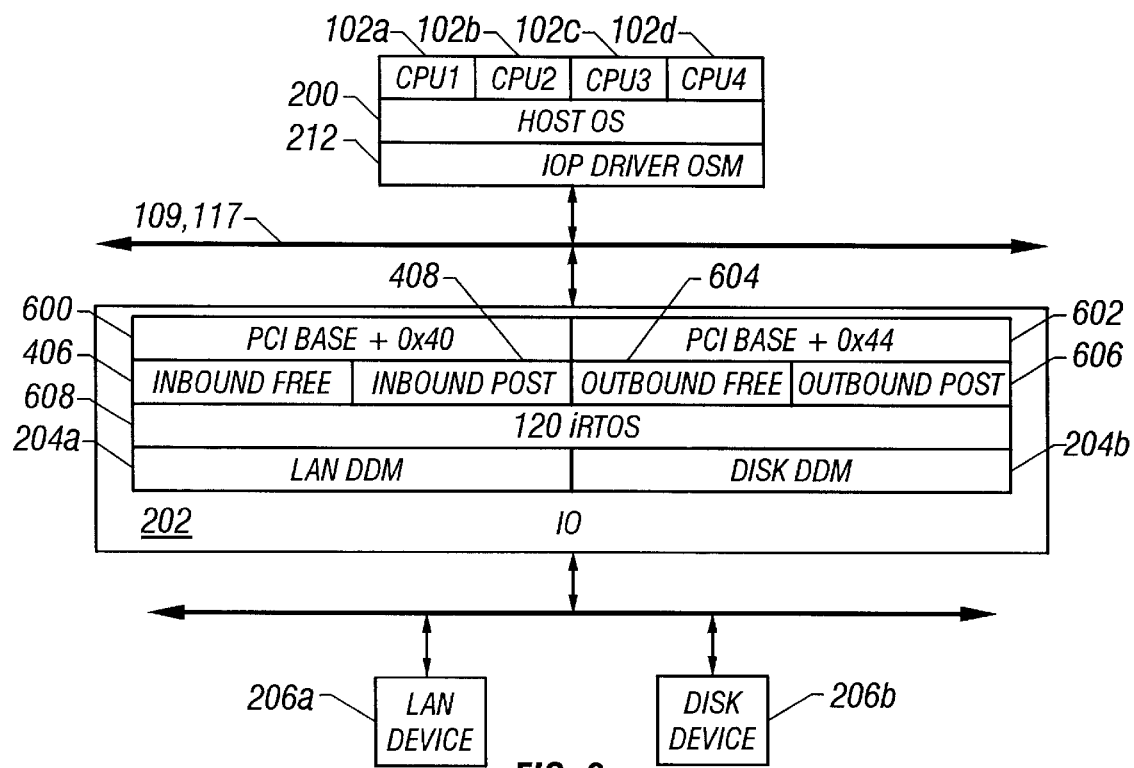
FIG. 6 is a schematic block diagram of the $I_2O$ standard architecture.
Figure 7:
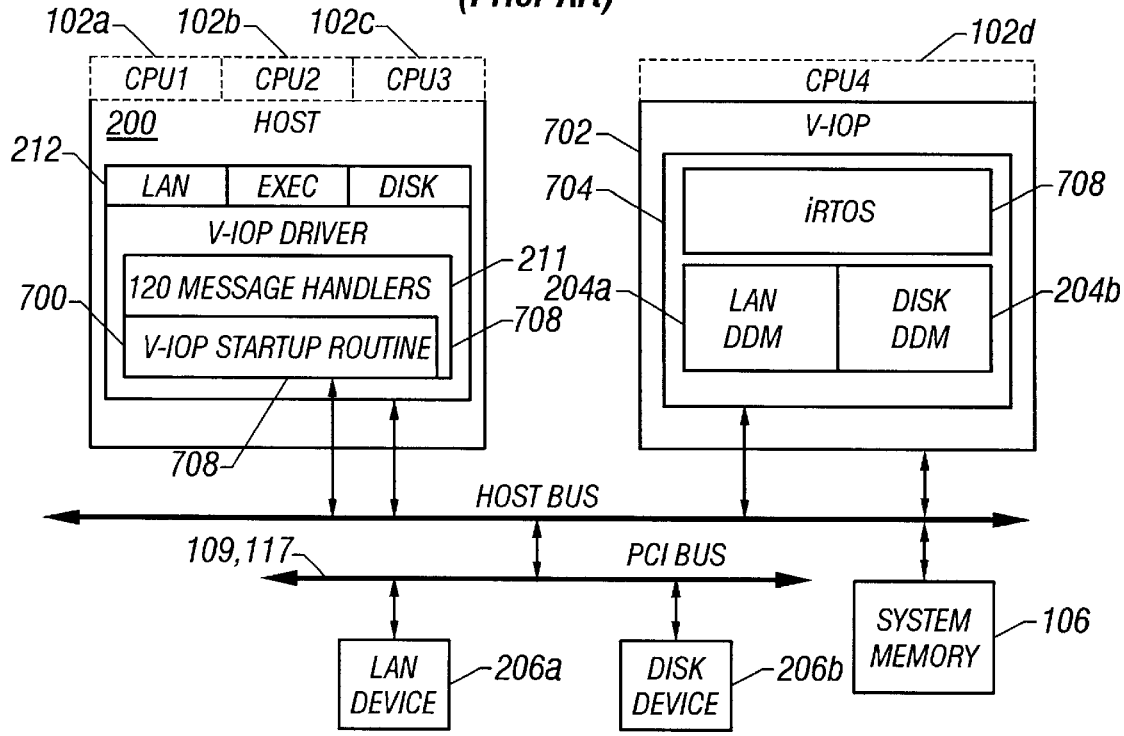
FIG. 7 is a schematic block diagram of the $I_2O$-compliant software architecture according to the present invention.

An overview of the software architecture of the present invention is illustrated in FIG. 7. As in a standard $I_2O$ compliant system, the input-output driver 211 is an operating system module (OSM) that executes under the control of the host OS 200. Unlike the prior art implementation of I₂O, which requires a separate, special hardware IOP board 202 (FIGS. 1 and 6) connected to the PCI bus 117 (FIG. 1) in order to execute a standard iRTOS (not shown) and associated DDMs (204a and 204b), the present invention shown in FIG. 7 allocates one or more CPUs 102d to the task of acting as a virtual IOP ("V-IOP") 702. Executing on the V-IOP 702 is the V-IOP OS 704 in the form of a special wrapper 704 that contains an iRTOS 710 with I₂O functionality as well as the associated DDMs (204a and 204b). The wrapper 704 presents an I₂O iRTOS personality to the DDM's, i.e., the DDM's within the wrapper 704 cannot distinguish the iRTOS 710 in the wrapper 704 from a standard I₂O iRTOS running on a separate IOP running on the host OS. The wrapper 704 is described more fully in commonly owned U.S. patent application Ser. No. 09/152,728; filed Sep. 23, 1998 still pending; entitled "Method and Apparatus for Providing Symmetric Multiprocessing in an I₂O Real-Time Operating System" by Thomas J. Bonola, and is hereby incorporated by reference.

The present invention also differs from the prior art in that it allocates memory for the V-IOP 702 within the computer system RAM 106 (FIG. 7) rather than from dedicated memory on a physical IOP board 202. Yet another way in which the present invention differs from the prior art is that, although it can communicate with devices connected to a PCI bus as in the prior art, it can also communicate with hardware I/O devices 206a and 206b connected to non-PCI buses, such as the EISA/ISA bus 113 (FIG. 1) commonly found in legacy computer systems. Finally, the present invention differs from the prior art in that all messages between the input-output operating system module ("OSM") 212 (which contains the standard IOP driver 211), and the iRTOS 710 within the wrapper 704 that is executing on the V-IOP 702, are sent over the host bus 103 via the I₂O message handlers 706 in the V-IOP driver 700.

The V-IOP driver 700 also contains a V-IOP startup routine 708 that is used to allocate a CPU, load the V-IOP OS onto that CPU, perform a fix up procedure to link the V-IOP OS to the V-IOP driver, and then launch (i.e. restart) that CPU so that it will operate under the V-IOP OS to form a V-IOP.

Initalization and Starting of the Software

Figure 8:
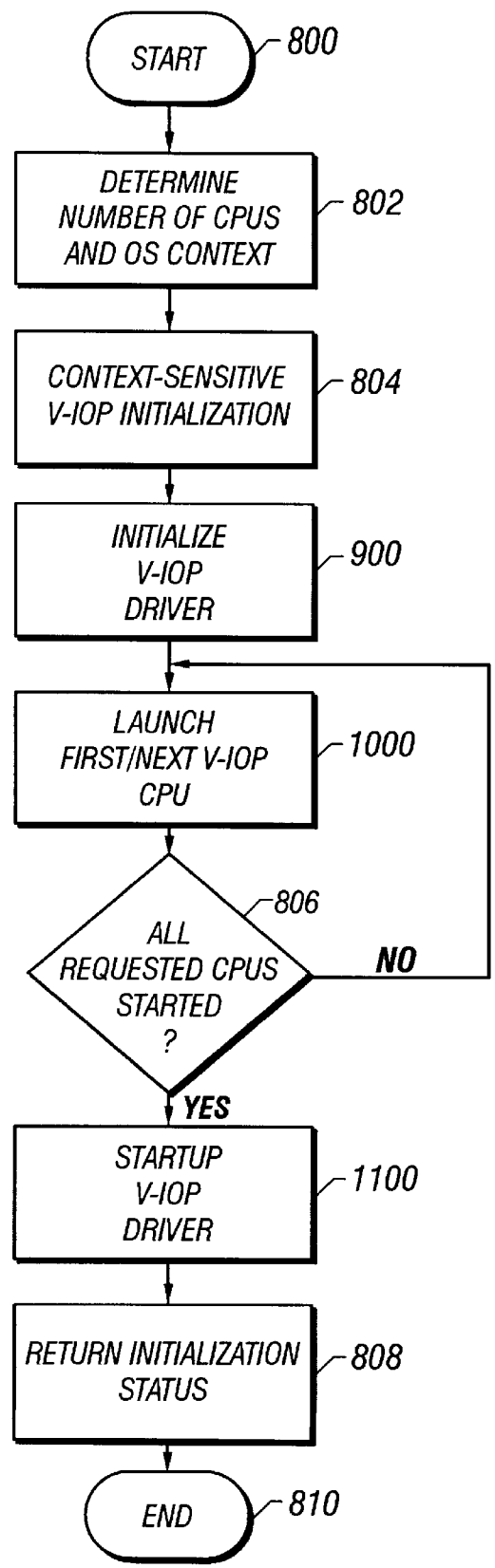
FIG. 8 is a flow diagram showing the process of initializing and starting the software of the present invention.

FIG. 8 is a flow diagram showing the overall process of initializing and starting the software of the present invention. Specific elements of the initialization process are explained more fully elsewhere in the description and other figures. For example, step 900 is illustrated in FIG. 9, step 1000 in FIG. 10, and so on with corresponding textual explanation found in subsequent sub-sections.

The initialization and starting process is entered in step 800. First, in step 802, the number of CPU's present in the computer system is determined along with the context of the computer system. Part of the context determination process includes determining which operating system has overall command of the computer system. For example, a typical context for the present invention would have a PENTIUM PRO multiprocessor (made by Intel Corp.) utilizing A WINDOWS NT (manufactured by Microsoft Corp.) as an operating system. Once the context has been determined, the V-IOP driver will be initialized in step 804. The manner in which the V-IOP driver is initialized depends upon the context detected in step 802. Next, in step 900, the V-IOP driver will be initialized. Once the V-IOP driver has been initialized, the first V-IOP CPU is launched in step 1000. A check is made in step 806 to determine whether any more V-IOPs were requested (per the installation procedure). If so, step 1000 is repeated until all of the requested V-IOP CPUs have been launched. Once all of the V-IOP CPUs have been launched, the V-IOP driver is started, step 1100. The initialization status is then returned to the host OS in step 808 and the initialization and startup process ends in step 810 and control is returned to the calling module.

Initialization of the V-IOP Driver

Figure 9:
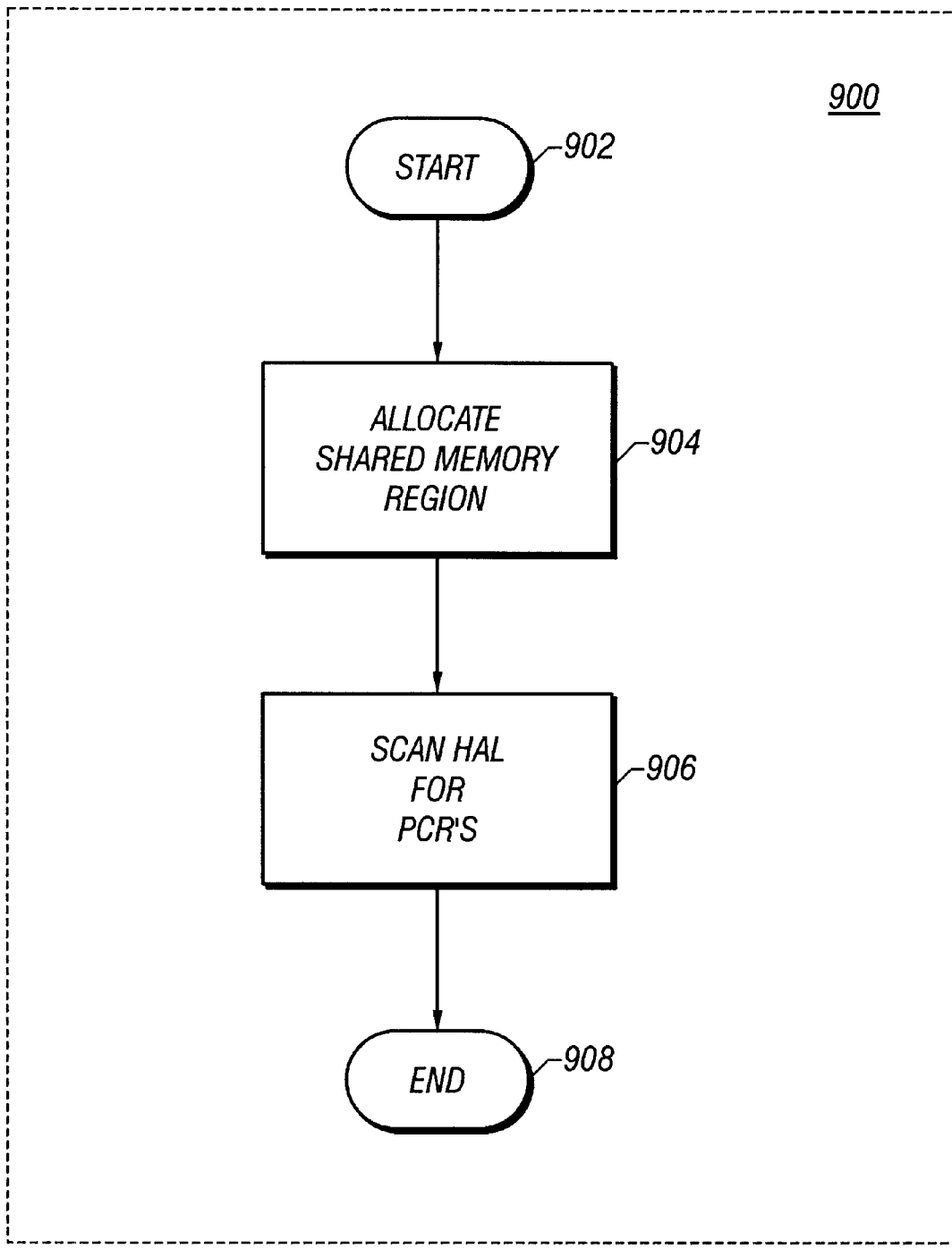
FIG. 9 is a flow diagram showing the initialization process for the V-IOP Driver.

FIG. 9 illustrates the initialization process for the V-IOP driver. As mentioned earlier, one of the features of the present invention that is not duplicated in the prior art is the utilization of shared memory for IOP purposes instead of requiring extra RAM on a separate IOP card. One consequence of this feature is the need to allocate a region of shared memory (106 of FIG. 1) for use by the V-IOPs and the V-IOP driver. The process is entered in step 902 and, in step 904, shared memory is allocated for use by all V-IOPs and the V-IOP driver. Finally, the hardware abstraction layer (HAL) is scanned for processor control registers (PCRs), step 906. This process is ended in step 908 and control is returned to the calling module for subsequent processing (e.g., step 1000 of FIG. 8).

Launching of the V-IOP

Figure 10:
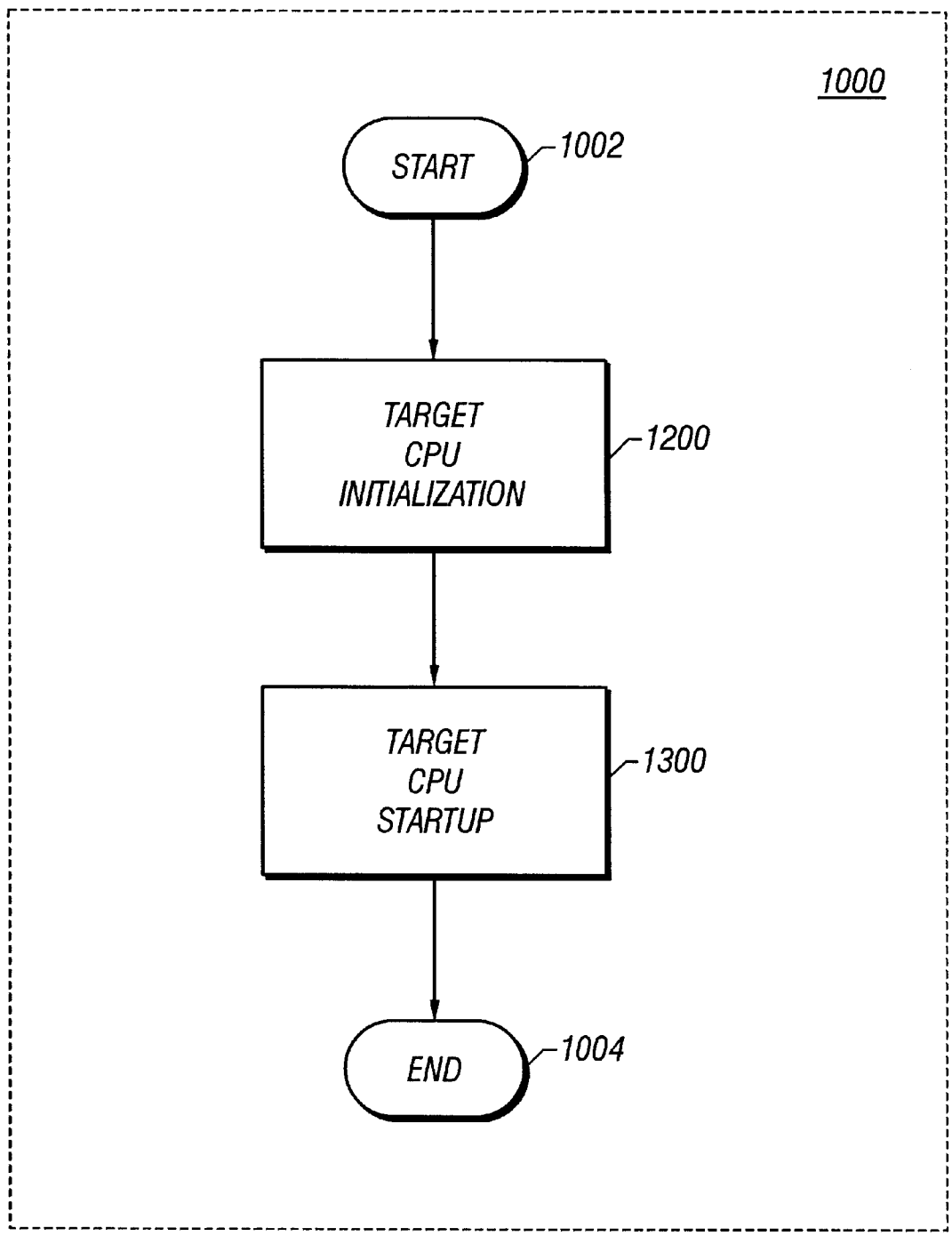
FIG. 10 is a flow diagram showing the launching of the V-IOP.

FIG. 10 is a flow diagram showing the launching of the V-IOP (step 1000 of FIG. 8). Portions of this process are illustrated more fully in FIGS. 12 and 13, as well as textually later in this description.

After the process is entered (step 1002), the target CPU is initialized, step 1200. A "target" CPU is one that has been designated for IOP processing. As mentioned earlier, the specific CPU that is targeted is not determined until startup time, to accommodate possible problems in the computer system that may not have been present when the V-IOP software was installed onto the computer system. Once the target CPU has been initialized, the target CPU is started in step 1300 to form a V-IOP. This initialization/startup procedure is performed for each of the CPUs that has been designated as an IOP. The process terminates and control is returned for subsequent processing, e.g. step 806 of FIG. 8.

Startup of the V-IOP Driver

Figure 11:
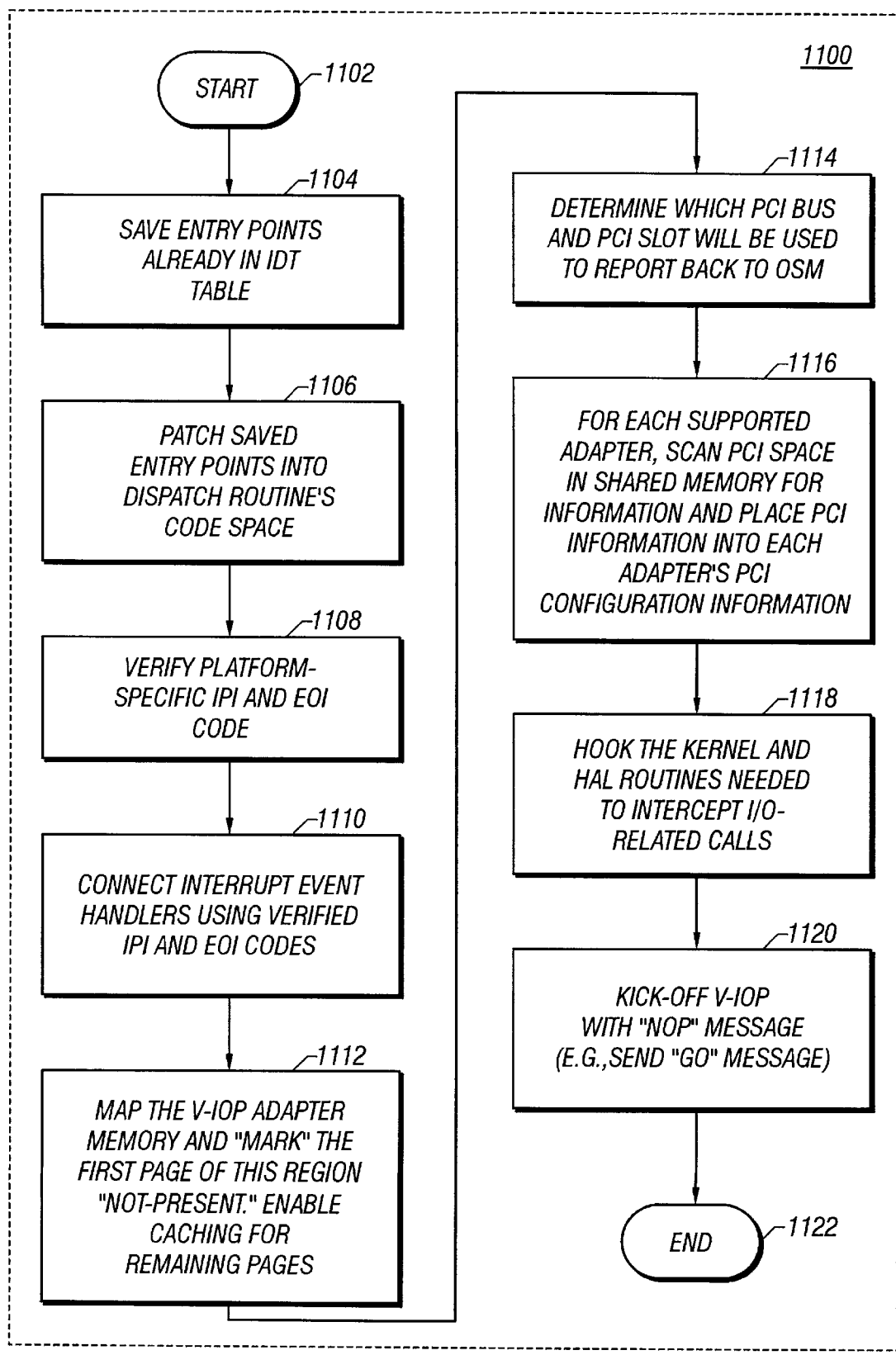
FIG. 11 is a flow diagram showing the startup of the V-IOP Driver.

FIG. 11 is a flow diagram showing the details of the startup process of the V-IOP driver (step 1100 of FIG. 8). The process is entered in step 1102. First, in step 1104, the entry points in the Interrupt Dispatch Table (IDT) are saved. Next, in step 1106, the saved entry points are patched into the dispatch routine's code space. In step 1108, the Inter-Processor Interrupt (IPI) and End of Interrupt (EOI) codes for the specific platform are verified. Once verified, the IPI and EOI codes are used to connect the various interrupt event handlers in step 1110. In step 1112, the virtual adapter memory region of the shared memory (i.e., the system memory 106 of FIG. 7) is mapped and the first page of this memory region is marked "Not-Present." By marking this memory region Not-Present, calls using this memory space, such as I/O-related calls to/from I/O devices will cause a page fault. Once the page fault occurs, it is intercepted by the V-IOP driver, the command interpreted, and, if necessary redirects the command to one of the V-IOPs. Note, only the first page is marked "Not-Present." In step 1112, caching is enabled for the remaining pages of the virtual adapter memory region.

Next, in step 1114, it is determined which PCI bus and PCI slot will be used to report back to the OSM. Subsequently, in step 1116, for each supported adapter, the PCI space in shared memory is scanned for information. This PCI information is placed into each adapter's PCI configuration information. In step 1118, hooks are made on the kernel and the HAL routines needed to intercept the I/O-related calls. Finally, the V-IOP driver is "kicked-off" with a "NOP" (no operation) messaged which, in this context, is essentially a "Go" message. The V-IOP driver startup routine ends in step 1122 and control is returned (to step 808 of FIG. 8) for subsequent processing.

Initialization of the Target CPU

Figure 12:
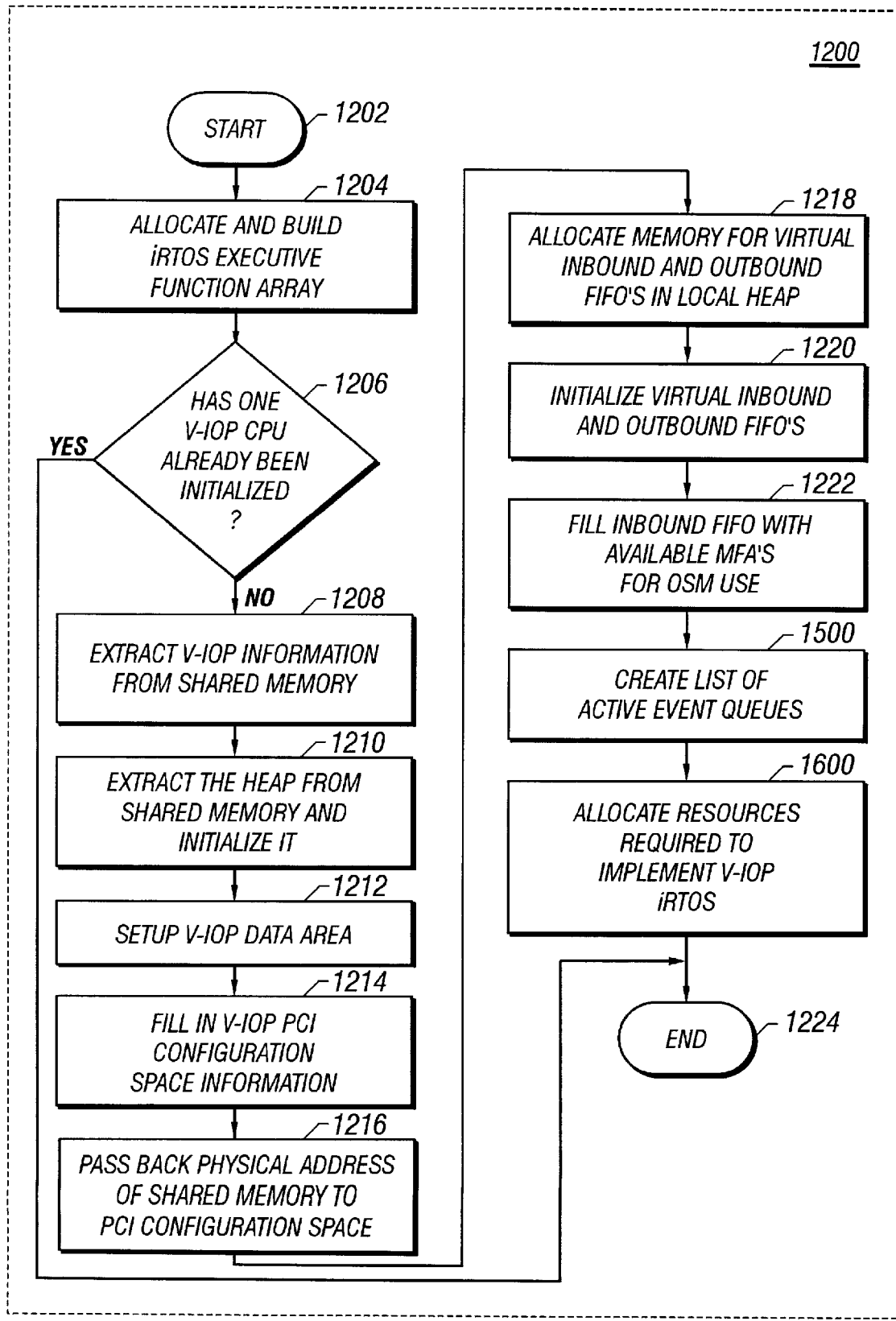
FIG. 12 is a flow diagram showing the Target CPU Initialization.

FIG. 12 is a flow diagram showing the Target CPU Initialization. The process is entered in step 1202. First, in step 1204, shared system memory is allocated for the iRTOS Executive Function Array and the array itself is then built. In step 206, a check is made to determine whether one of the V-IOP CPU's has already been initialized. If so, execution skips to step 1218. If not, then the next four steps are executed. In step 1208, V-IOP information is extracted from the shared memory. Next, in step 1210, The heap is extracted from the shared memory and initialized. Subsequently, with all of the critical information in place, the V-IOP PCI configuration space information is filled in during step 1214. Once this information is filled in, the specific physical address of the shared memory is passed back to the PCI configuration space in step 1216.

Step 1218 is executed only after at least one V-IOP CPU has been installed. During step 1218, memory is allocated for the virtual inbound and outbound FIFO's in the local heap. In the preferred embodiment of the present invention, the inbound and outbound FIFOs are both concurrent and non-blocking. However, other FIFO schemes, such as preemption-safe locking, can be utilized. Once the memory is allocated, then the virtual inbound and outbound FIFO's are initialized, step 1220. With the FIFO's initialized, the inbound FIFO is filled with the available MFA's (Message Frames) for use by the OSM in step 1222. Next, in step 1500, the list of active event queues is created. Step 1500 is described in more detail below and in FIG. 15. Finally, in step 1600, the resources that are required to implement the iRTOS in the V-IOP are allocated. Step 1600 is described in more detail below and in FIG. 16.

Startup of the Target CPU

Figure 13:
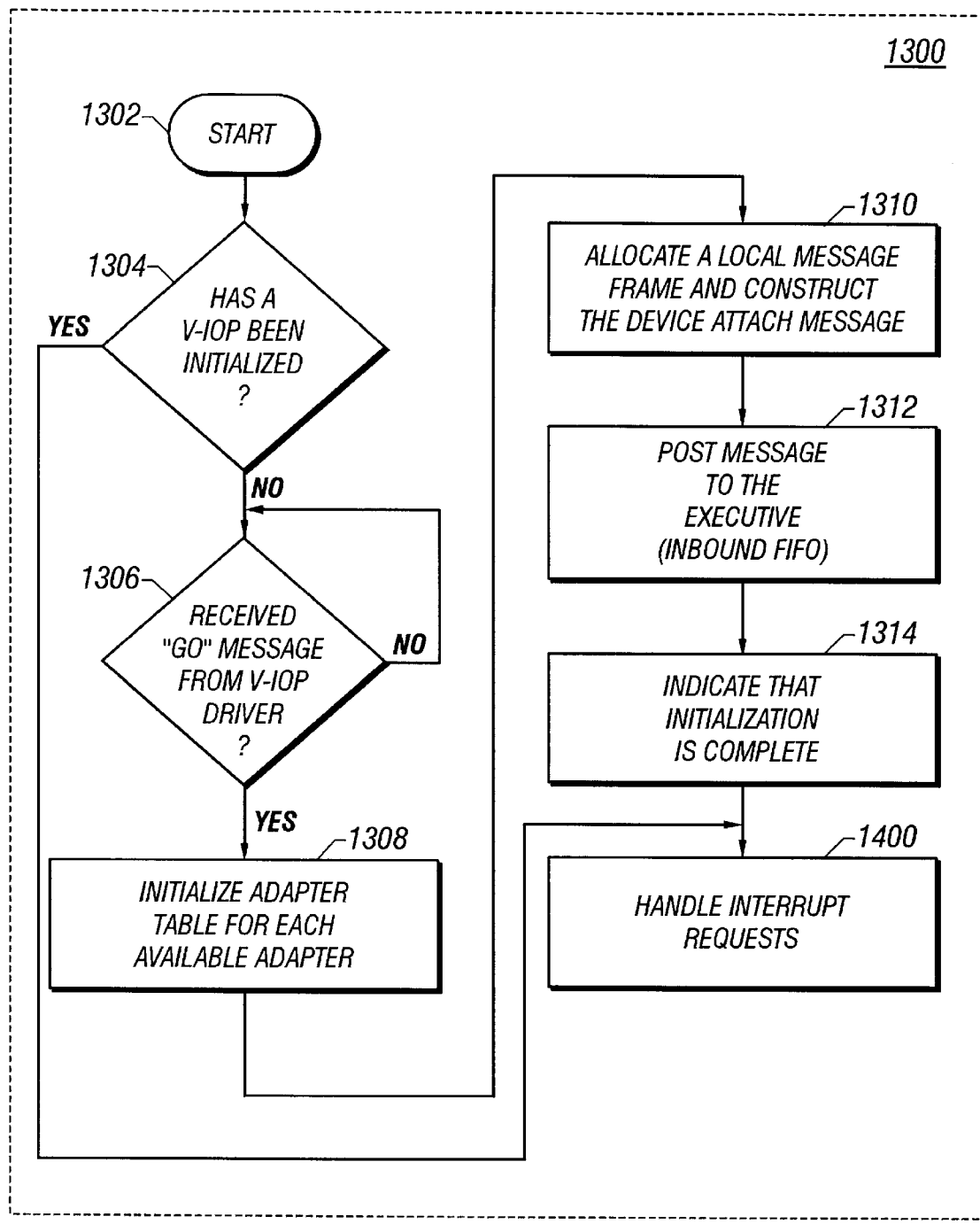
FIG. 13 is a flow diagram showing the Target CPU Startup.

FIG. 13 is a flow diagram showing the V-IOP (Target CPU) Startup. The process is entered in step 1302. First, in step 1304, a check is made to determine whether a V-IOP has been initialized. If so, then execution is redirected to step 1400. Otherwise, execution continues on to step 1306. In step 1306, a check is made to determine if a "Go" message was received from the V-IOP driver (indicating that the V-IOP has been initialized). If no "Go" message has been received, then step 1306 is re-executed—essentially placing the process in a wait mode until a "Go" signal is received from the V-IOP driver.

Once the "Go" signal has been received, execution resumes at step 1308, where the virtual adapter table for each available adapter is initialized. Next, in step 1310, memory for a local message frame is allocated and the Device Attach message is constructed. Subsequently, a message is posted to the Executive (i.e., the inbound FIFO). Afterwards, a signal is dispatched to indicate that the initialization of the V-IOP is complete. Once the V-IOP has been initialized, is now ready to handle interrupt requests per step 1400. Step 1400 is described in more detail below and in FIG. 14.

Handling Interrupt Requests

Figure 14:
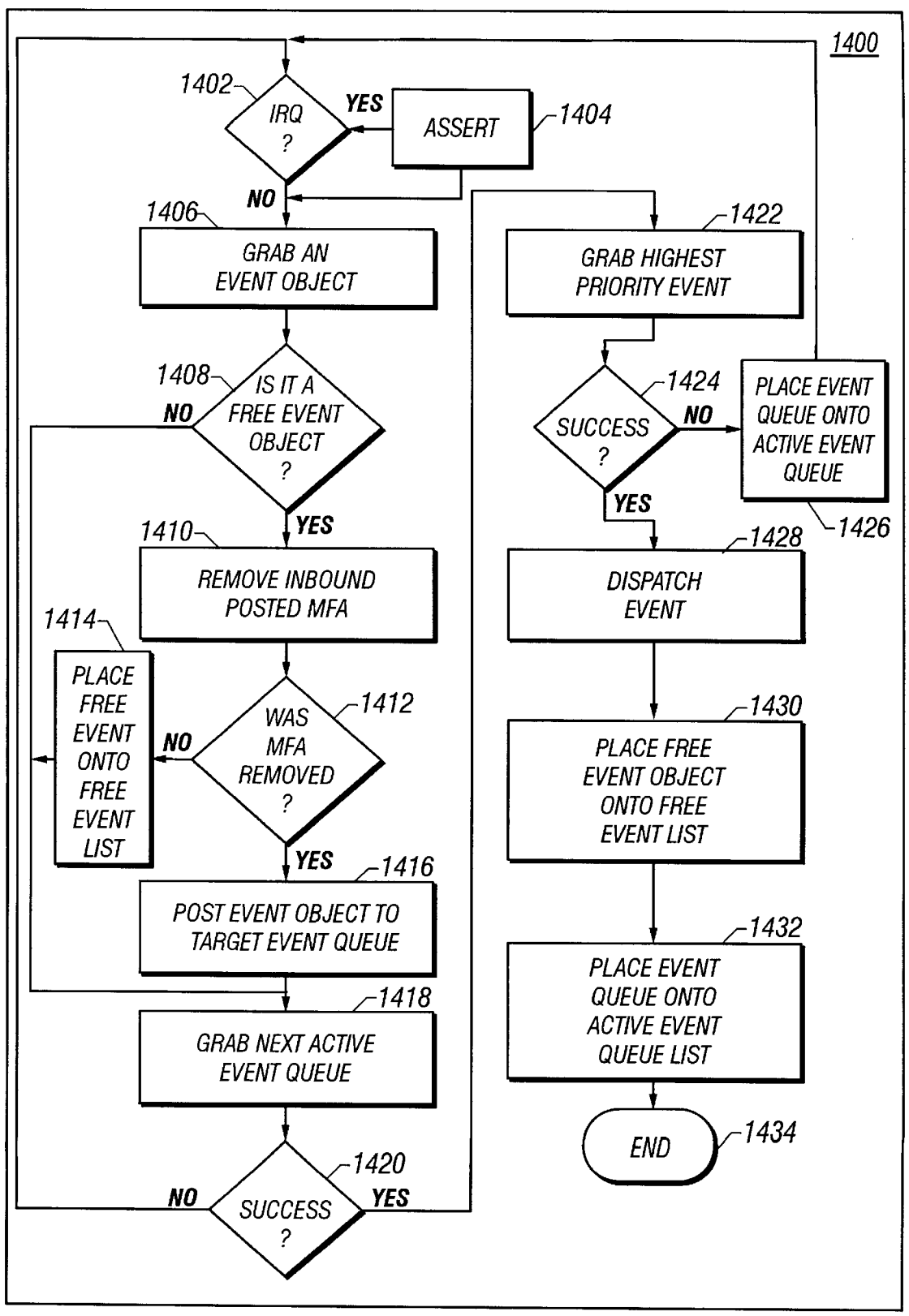
FIG. 14 is a flow diagram showing the method of handling interrupt requests.

FIG. 14 is a flow diagram showing the method of handling interrupt requests. The process is entered in step 1402 where a check is made to determine if the signal was an IRQ (interrupt request). If so, an assert process is executed in step 1404. The assert process of step 1404 is required because the iRTOS in the V-IOP OS runs as a software emulation that is not directly connected to a specific hardware device (that would otherwise issue the IRQ). In the assert process, the V-IOP OS posts a message to the outbound post list FIFO that asserts the IRQ to the proper hardware device.

If the signal is not an IRQ, or if the assert process has been performed, then step 1406 executed where the free event object is grabbed. Next, in step 1408, a check is made to determine whether the grabbed object is a free event object. If not, execution is routed to step 1418. Otherwise, execution proceeds to step 1410 where the inbound posted MFA is removed. A check is made immediately to determine if an MFA was removed in step 1412. If not, then the free event is placed onto the free event list in step 1414 and execution is then routed to step 1418. If, however, an MFA was removed in step 1412, then the event object is posted to the target event queue in step 1416. In step 1418, the next active event queue is grabbed. A check is made in step 1420 to determine if the grabbing step of 1418 was successful. If not, execution is rerouted all the way back to the beginning to step 1402. Otherwise, if successful, then execution is allowed to proceed to step 1422.

In step 1422, the highest priority event is grabbed. The success or failure of step 1422 is determined in step 1424. If failure was detected in step 1422, then the event queue is placed onto the active event queue and execution is rerouted to the beginning at step 1402 to await the next signal. Otherwise (i.e., success was detected in step 1422), then execution proceeds to step 1428 where the event is dispatched. Once the event is dispatched, the free event object is placed onto the free event list, step 1430. Finally, in step 1432, the event queue is placed onto the active event queue list and the process ends in step 1434.

Creating the Active Event Queues

Figure 15:
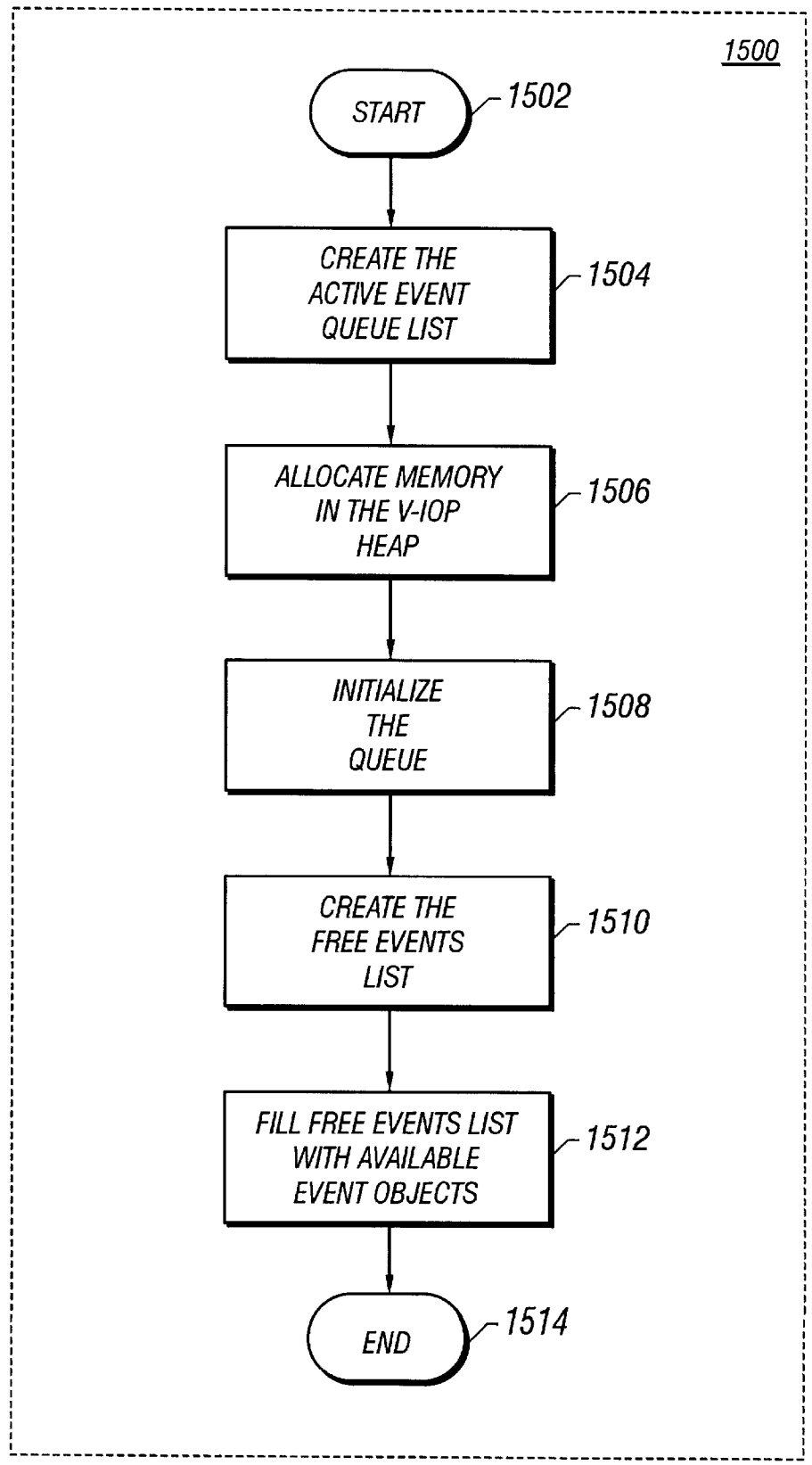
FIG. 15 is a flow diagram showing the creation of the List of Active Event Queues.

FIG. 15 is a flow diagram showing the creation of the List of Active Event Queues. This process starts in step 1502. First, in step 1504, the active event queue list is created. Next, in step 1506, memory in the shared memory heap is allocated. Once allocated, the active event queue is initialized in step 1508. Next, in step 1510, the free event list is created and, in step 1512, the free events list is filled with the available event objects. Execution is returned to the calling routine in step 1514 (see FIG. 12).

Allocating the Resources for the V-IOP iRTOS

Figure 16:
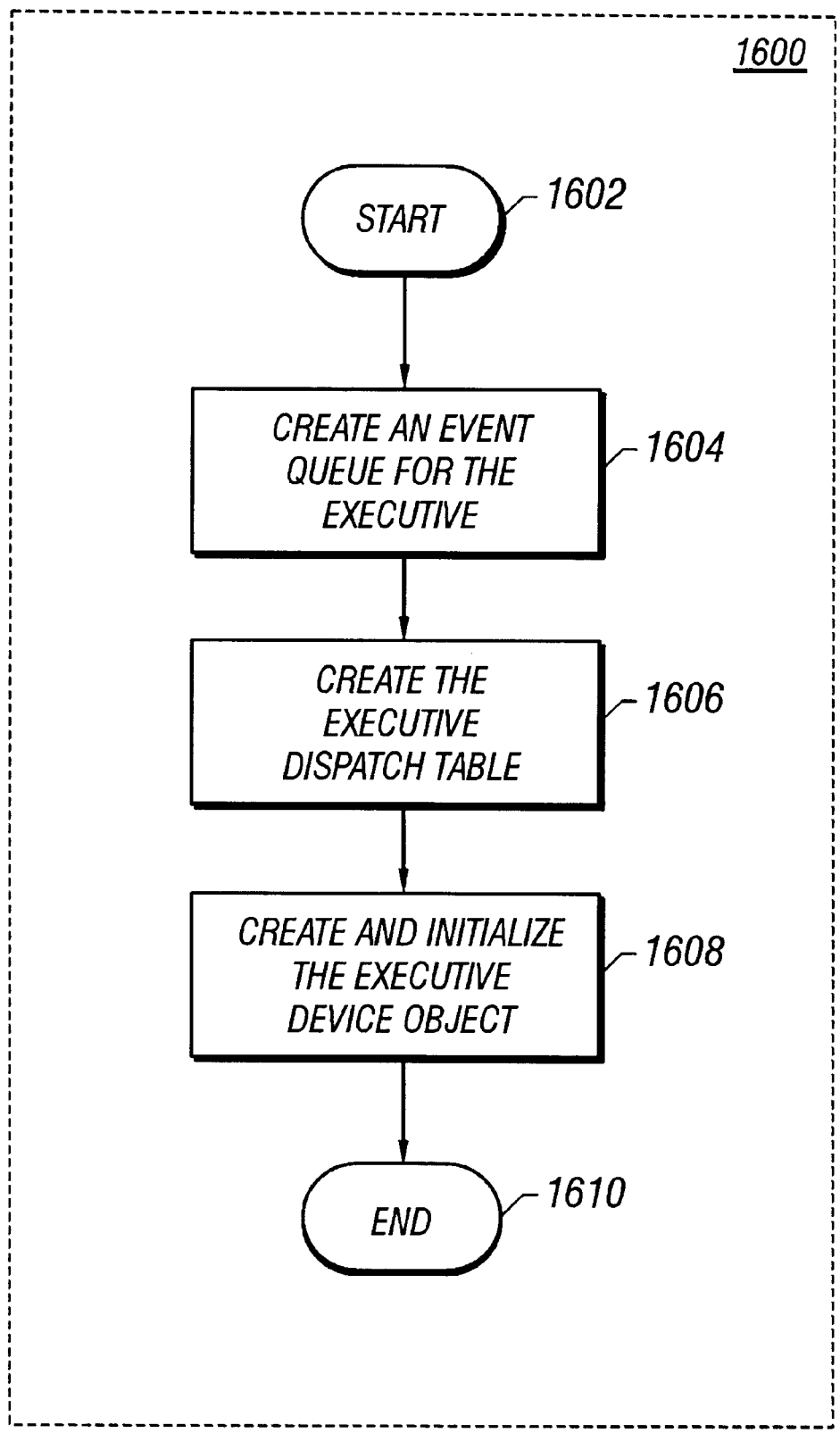
FIG. 16 is a flow diagram showing the allocation of resource required to implement the V-IOP iRTOS.

FIG. 16 is a flow diagram showing the allocation of resource required to implement the iRTOS in the V-IOP. This process is started in step 1602. First, the event queue for the Executive is created in step 1604. Next, the Executive dispatch table is created in step 1606. Finally, the Executive device object is created and initialized in step 1608. Execution is returned to the calling routine in step 1610 (see FIG. 12).

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a plurality of central processing units, a host bus, a host operating system, system memory, at least one input-output bus connected to said host bus, at least one device driver module, and at least one input-output device connected to said input-output bus, said computer system comprising:
   at least one operating system module, said operating system module contained within said host operating system, said operating system module capable of sending and receiving messages from said host bus and said host operating system;
   a target central processor unit selected from said plurality of said central processor units; and
   at least one message handler, said message handler capable of intercepting and redirecting said messages directed either to or from said operating system module;
   wherein said message handler intercepts said messages directed either to or from said operating system module and redirects said messages to said target central processor units thereby allowing said target central processor unit to handle said messages.

2. The computer system of claim 1, further comprising an input-output real time operating system executing on said target central processor unit to form a virtual input-output processor.

3. The computer system of claim 2, wherein said real-time input-output operating system complies with an I$_2$O standard real-time operating system.

4. The computer system of claim 2, further comprising said virtual input-output processor has a wrapper for said real-time input-output operating system.

5. The computer system of claim 2, wherein said operating system module complies with an I$_2$O standard.

6. The computer system of claim 2, wherein said at least one device driver module executes within said virtual input-output processor.

7. The computer system of claim 2, further comprising a startup function for said virtual input-output processor.

8. The computer system of claim 2, further comprising an initialization function for said virtual input-output processor.

9. A method of enabling an input-output message handler on a computer system having a plurality of central processing units, a host bus, a system memory, a host operating system, at least one device driver module, at least one input-output device, at least one input-output bus connecting said input-output device to said host bus, and a real-time input-output operating system program, said real-time input-output operating system program capable of handling messages between said at least one input-output device and said host operating system, said method comprising the steps of:
   (a) initializing a virtual input-output processor operating system program on any one of said plurality of central processing units, said virtual input-output processor operating system program capable of executing said real-time input-output operating system program;
   (b) launching said virtual input-output processor operating system on said any one of said plurality of central processing units to form a virtual input-output processor; and
   (c) executing said real-time input-output operating system program on said virtual input-output processor, wherein said real-time input-output operating system program handles messages between said input-output devices and said host operating system.

10. The method of claim 9, wherein said virtual input-output processor complies with an I$_2$O standard.

11. A method of enabling an input-output massage handler on a computer system having at least two central processing units, a host bus, a system memory, a host operating system, said host operating system executing on a first one of said two central processing units, at least one input-output device, at least one device driver module for said input-output device, at least one input-output bus connecting said input-output device to said host bus, and a real-time input-output operating system program, said method comprising the steps of:
   (a) initializing a virtual input-output processor driver on the first one of said at least two central processing units;
   (b) initializing a virtual input-output processor operating system program on a second one of said at least two central processing units selected therefrom;
   (c) launching said virtual input-output processor operating system program to form a virtual input-output processor, said virtual input-output processor capable of executing said real-time input-output operating system program; and
   (d) starting said virtual input-output processor driver, said virtual input-output driver capable of redirecting messages either to or from said input-output devices to said virtual input-output processor;
   wherein said real-time input-output operating system program handles said messages.

12. The method of claim 11, wherein said virtual input-output processor complies with an I$_2$O standard.

13. A method of enabling an input-output message handler on a computer system having a plurality of central processing units, a host bus, system memory, a host operating system, at least one device driver module, at least one input-output device, at least one input-output bus connecting said input-output device to said host bus, said input-output bus having a plurality of slots, and a real-time input-output operating system program, said real-time input-output operating system program capable of handling messages between said at least one input-output device and said host operating system, said method comprising the steps of:
   (a) determining the number of central processing units on said computer system;
   (b) determining the context of said operating system in order to obtain context sensitive information;
   (c) targeting at least one of said central processing units for input-output processing to form a target central processor unit;
   (d) initializing a virtual input-output processor operating system program each of said target central processing units to form at least one virtual input-output processor, said virtual input-output processor operating system program capable of executing said real-time input-output operating system program;

(e) initializing a virtual input-output processor driver;

(f) launching all of said virtual input-output processors; and (g) starting said virtual input-output processor driver, said virtual input-output processor driver capable of intercepting and redirecting said messages to said virtual input-output processors;

wherein said real-time input-output operating system programs on said virtual input-output processors handle messages between said at least one input-output device driver and said virtual input-output processor driver.

14. The method of claim 13, wherein said step of initializing said virtual input-output processor driver comprises the steps of:

(ca) allocating memory to form a shared memory region; and (cb) scanning a hardware abstraction layer for processor control registers.

15. The method of claim 13, wherein said step of launching all of said virtual input-output processors comprises the steps of:

(da) initializing each of said target central processor units; and (db) starting each of said target central processor units.

16. The method of claim 13, wherein said step of starting said virtual input-output processor driver comprises the steps of:

(ea) saving at least one entry point in an interrupt dispatch table;

(eb) patching said entry points into a code space of a dispatch routine;

(ec) verifying an inter-processor interrupt code and an end of interrupt code for said computer system;

(ed) connecting at least one interrupt handler of said virtual input-output processor driver with said inter-processor interrupt code and said end of interrupt code;

(ee) mapping a virtual adapter memory region of said shared memory and marking a first page of said virtual adapter memory region not-present;

(ef) determining which of said slots of said input-output bus will be used to report back to said device driver module;

(eg) scanning space in said shared memory for configuration information related to said input-output devices;

(eh) placing said configuration information into each of said virtual adapter memory region of said shared memory;

(ei) placing hooks into a kernel of said operating system and into at least one hardware abstraction layer routines of said operating system necessary to intercept input-output related calls; and (ej) kicking off said virtual input-output processor driver with a no operation message.

17. The method of claim 15, wherein said step of initializing each of said target central processor units comprises the steps of:

(daa) allocating memory for an real-time input-output operating system executive function array and then building said executive function array;

(dab) checking to verify if any of said virtual input-output processor has been initialized and, if not, then;

(daba) extracting virtual input-output processor information from said shared memory;

(dabb) extracting a heap from said shared memory and initializing said heap;

(dabc) setting up a virtual input-output processor data area;

(dabd) filling in configuration space information about said input-output devices for said virtual input-output processors at a configuration space in said shared memory; and (dabe) passing back a physical address of said shared memory to said configuration space;

(dac) allocating memory for at least one virtual inbound FIFO and at least one virtual outbound FIFO in said heap;

(dad) initializing said virtual inbound FIFO and said virtual outbound FIFO;

(dae) filling said virtual inbound FIFO and said virtual outbound FIFO with an available message frame;

(daf) creating a list of active event queues; and (dag) allocating resources required to implement said real-time input-output operating system program on said virtual input-output processor.

18. The method of claim 15, wherein said step of starting each of said target central processor units comprises the steps of:

(dba) for each virtual input-output processor, verifying if each of said virtual input-output processors has been initialized, and, if not, then (dbaa) determining if a go message was received from said virtual input-output processor driver, and, if not, then waiting and rechecking until said go message is received;

(dbab) initializing an adapter table for each available adapter;

(dbac) allocating a message frame and constructing a device attach message;

(dbad) posting said device attach message to an executive function;

(dbae) indicating that said initialization is complete; and (dbb) handling interrupt requests.

19. The method of claim 18, wherein said step of handling interrupt requests comprises the steps of:

(dbba) determining if an incoming signal is an interrupt request and, if so, executing an assert process;

(dbbb) grabbing an event object;

(dbbc) determining whether said grabbed event object is a free event object, and, if so then (dbbca) removing an inbound message frame;

(dbbcb) verifying if said inbound message frame was removed, and, if not, placing said free event object onto said free event list, otherwise posting said event object to a target event queue;

(dbbd) grabbing a next active event queue;

(dbbe) determining if said step of grabbing said next active event queue was successful, if not then jumping to step (dbba);

(dbbf) grabbing an event of highest priority;

(dbbg) determining if said step of grabbing said event of highest priority was successful, if not, then placing said event object onto said active event queue and jumping to step (dbba);

(dbbh) dispatching said event of highest priority;

(dbbi) placing said free event object onto said free event list; and (dbbj) placing said event queue onto said active event queue list.

20. The method of claim 17, wherein said step of creating a list of active event queues comprises the steps of:

(dafa) creating an active event queue list;

(dafb) allocating memory to a heap of said in said shared memory;

(dafc) initializing said active event queue;

(dafd) creating a free events list; and (dafe) filling said free event list with available event objects.

21. The method of claim 17, wherein said step of allocating resources required to implement said real-time input-output operating system program on said virtual input-output processor comprises the steps of:

(daga) creating an event queue for said executive function;

(dagb) creating a dispatch table for said executive function; and (dagc) creating and initializing a device object of said executive function.

22. The computer system of claim 2, further comprising an installation function for said virtual input-output processor.

* * * * *